United States Patent [19]

Huang

[11] Patent Number: 5,142,926
[45] Date of Patent: Sep. 1, 1992

[54] VARIABLE SPEED TRANSMISSION MECHANISM

[76] Inventor: Ching-Shiang Huang, 1F, No. 9, Lane 394, Chung Chen North Rd., Hsien, Sanchung City, Taipei, Taiwan

[21] Appl. No.: 641,477

[22] Filed: Jan. 15, 1991

[51] Int. Cl.$^5$ .................. F16H 15/00; F16H 15/08
[52] U.S. Cl. .................... 74/190; 74/191; 74/201
[58] Field of Search ................ 74/190, 191, 200, 201

[56] References Cited

U.S. PATENT DOCUMENTS

| | | | |
|---|---|---|---|
| 1,291,542 | 1/1919 | Kawell | 74/191 |
| 2,057,482 | 10/1936 | Erban | 74/200 X |
| 3,302,474 | 2/1967 | Edlich | 74/200 |

FOREIGN PATENT DOCUMENTS

| | | | |
|---|---|---|---|
| 2749150 | 5/1978 | Fed. Rep. of Germany | 74/190 |
| 527182 | 7/1921 | France | 74/191 |
| 75605 | 10/1932 | Sweden | 74/200 |

Primary Examiner—Allan D. Herrmann
Assistant Examiner—David W. Laub
Attorney, Agent, or Firm—Leonard Bloom

[57] ABSTRACT

A variable speed transmission mechanism that easily achieves multiple variable speed effect, smooth operation as well as to economize energy. The mechanism includes a pair of fly wheels being arranged in parallel. The fly wheels being respectively fixedly or movably turning around a support. At least one or more input devices and force output devices being respectively mounted at a radial position between the fly wheels, having two friction wheel assemblies for frictional transmission together with the fly wheels. When the input device driving fly wheels to rotate at a fixed speed, to change the position of the input device or output device form the outer rim of fly wheels to the center of fly wheels, the output device would carry unequal inertia eccentric force and the input power to the input device can be adjusted lower, whereby the output device may obtain smooth and unequal output speed and horsepower and expand the range of variable speed depending on the increment of diameter of fly wheel in order to offer extremely high value of utilization in the field of industry.

12 Claims, 4 Drawing Sheets

VARIABLE SPEED TRANSMISSION MECHANISM

FIELD OF THE INVENTION

The present invention relates to a variable speed transmission mechanism and, more particularly, to a variable speed mechanism to provide multi-axial output speed.

BACKGROUND OF THE INVENTION

Generally speaking, providing for variable speed operation for a transmission system in order to meet different conditions or changes, due to the requirement of operation, is one of the important cycles of system technology. Today, relatively common variable speed gear systems are V-belt or the Vario system, employing hydraulic and automatic variable speed gear mechanisms, frequency converters, voltage governors and planet wheel systems, etc. The V-belt system achieves the effect of 3 times to 5 times variable speed by means of adjusting the spacing of pulleys, but the loss of transmission power at the belt is comparatively great. Besides, the range of adjusting the spacing of pulleys is limited, so that such a System is notable to extend the range of variable speed. In general, said hydraulic and automatic variable speed transmission mechanisms are often applied to cars, and the function of automatic variable speed is effective when the car runs at a certain speed. However, there are various conditions that tend to affect car speed, so that such mechanism would need a sensitive governor, that is operated together with throttle valves and an accelerating pedal, which is not convenient.

The frequency converter or voltage governor is provided to change the speed of AC or DC motor, but its use is not preferred because of the loss of output power that occurs at the motor from the use thereof. In the planet wheel system, a sun wheel is provided as an input end and minor friction wheels are provided to drive an internally-connected planet wheel. For variable speed, the position of the friction wheels can be changed. In general, the range of variable speed relating to said system is limited within 5 times and maximum power ratio at 1 because the displacement of friction wheels is limited. Besides, slipping and vibration occur very often in such systems while providing variable speed.

In order to solve the defects found in traditional variable speed systems and mechanisms, the present invention is now to be disclosed.

SUMMARY OF THE INVENTION

One object of the present invention is to provide a stage or non-stage variable speed mechanism that is effective for industrial purposes.

Another object of the present invention is to provide a variable speed mechanism that is permissible for multi-axial output.

Still another object of the present invention is to provide a variable speed mechanism that extends the range of output speed, by increases in the diameter of fly wheel, and which economizes energy consumption.

Still another object of the present invention is to provide a variable speed mechanism having the function of a clutch device without vibration and noise.

Other objects, features and advantages of the present invention shall be better understood from the following descriptions when taken in conjunction with the accompanying drawings in which preferred embodiments of the present invention are shown by means of illustrative example. Nevertheless, special terms of equipment and accessories are provided only for explanation, not for limiting its meanings.

DESCRIPTION OF PREFERRED EMBODIMENT

Figure 1:
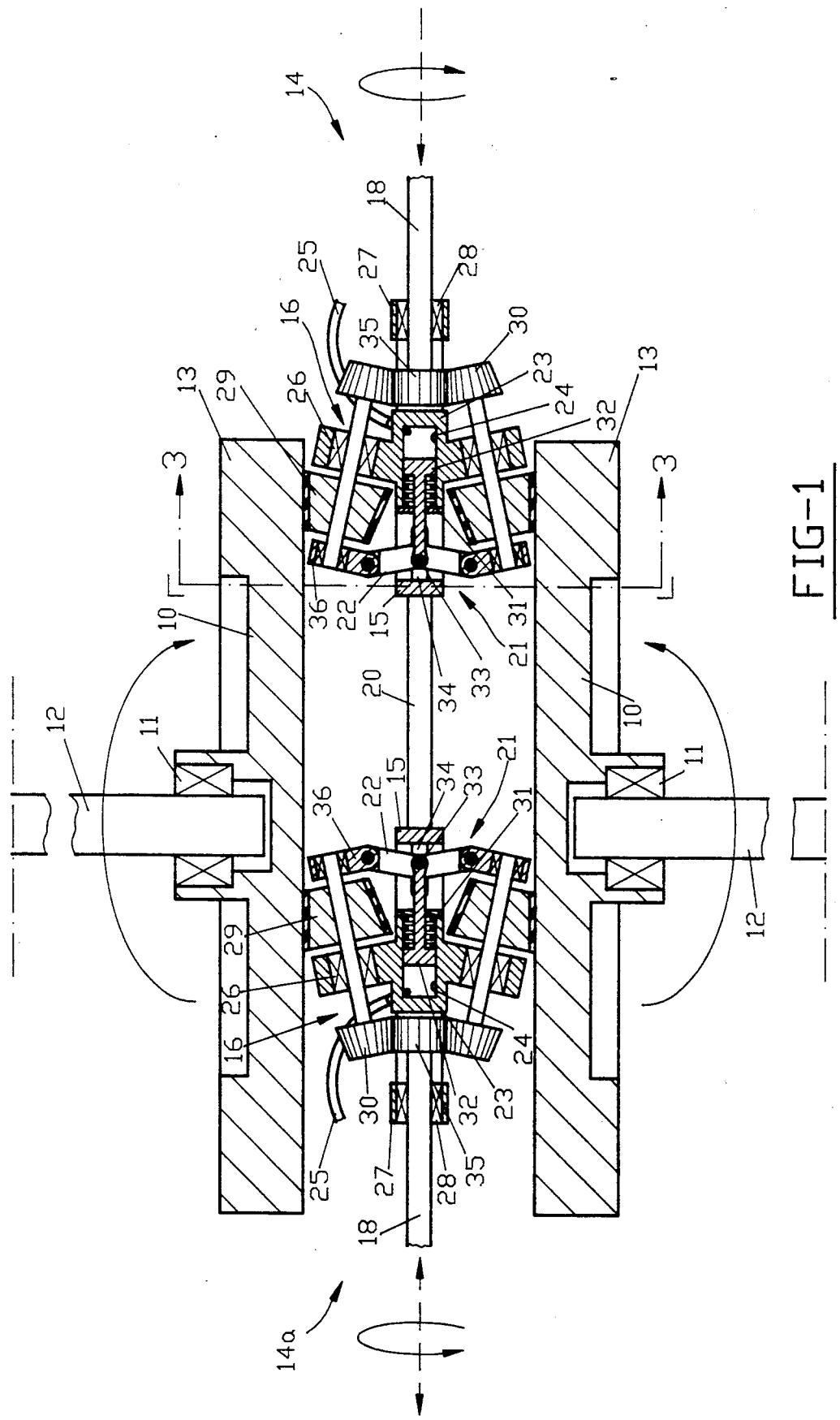
FIG. 1 is a cross sectional view, showing the variable speed mechanism of the present invention, wherein the mechanism is in an initial or low speed state.

Referring now to the drawings, a variable speed mechanism according to the present invention is seen to include a pair of fly wheels 10 that are mounted parallel to one another. Bearings 11 are mounted at the center of each wheel 10 and are provided to provide rotation of the wheels 10 about each supporting shaft 12 that, in turn, is provided mainly for supporting and positioning the fly wheels 10. For design, a single supporting shaft can be provided to support both of the fly wheels 10, or two supporting shafts 12 can be provided to connect fly wheels 10. The eccentric force of fly wheels 10 causes a significant influence upon the output power of the variable speed mechanism (to be described later). Therefore, for design, the external rim of fly wheels shall be increased with inertia, i.e. the rim of fly wheels 10 should be welded or otherwise formed so as to be enlarged as at 13. (see FIG. 1).

An input device 14 and an output device 14a are movable mounted between the fly wheels 10. Said input device 14 and output device 14a are composed of identical elements. It will be understood that, while for convenience, a single description, that has equal applicability to the input device 14 as well as the output device 14a, will now be presented.

Figure 2:
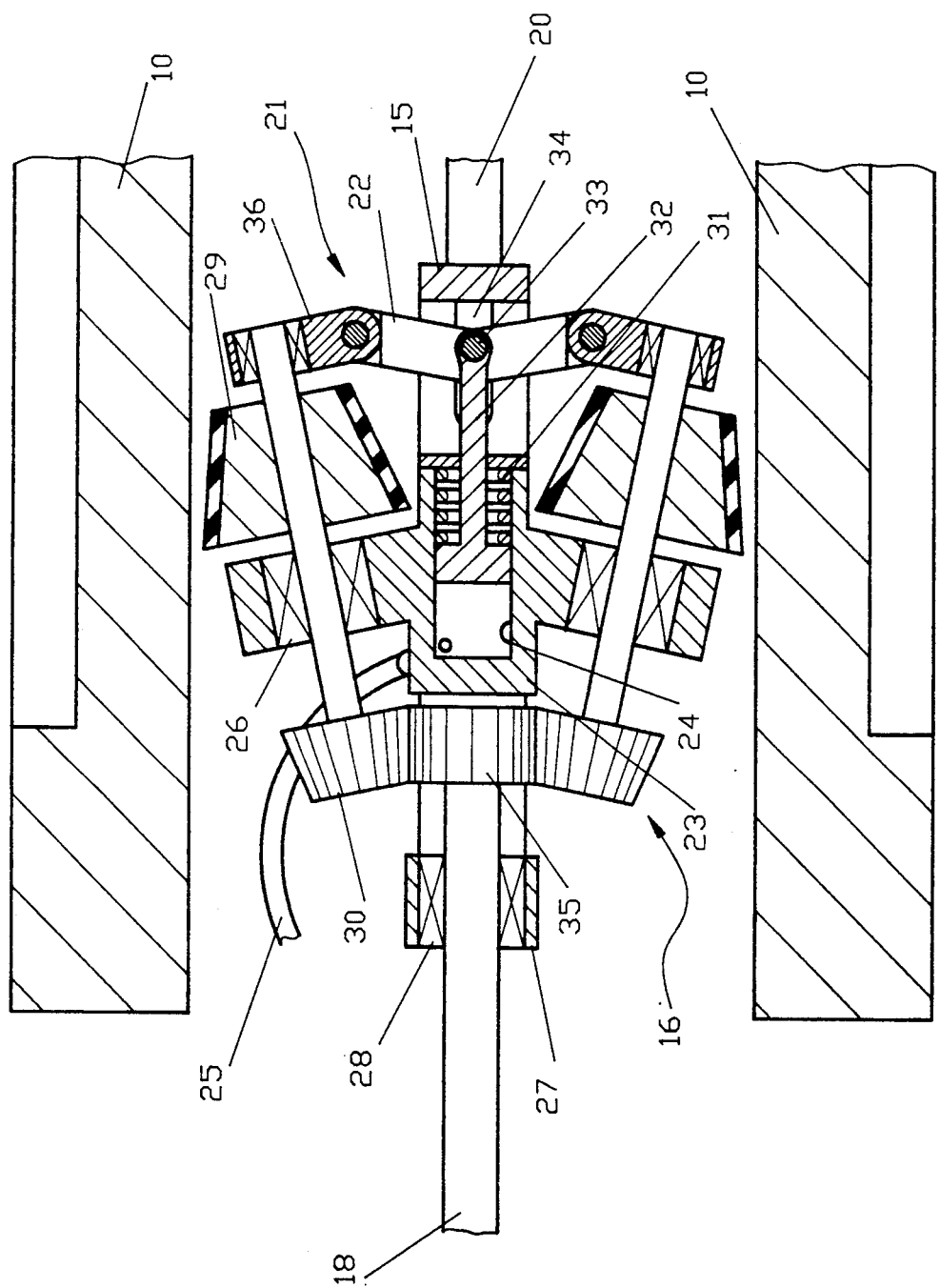
FIG. 2 is a partial sectional view, showing the clutch function of the mechanism of the present invention.
Figure 3:
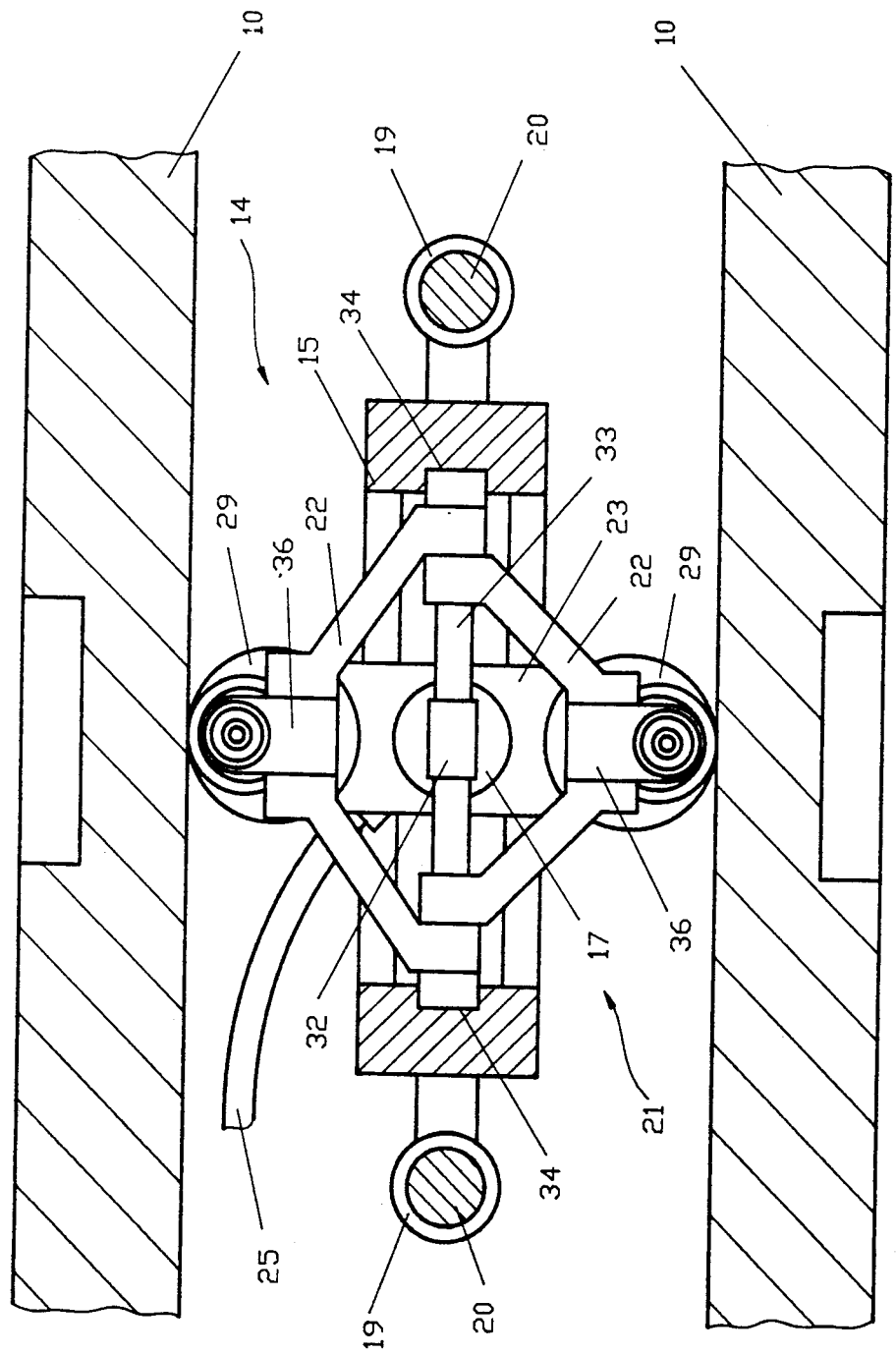
FIG. 3 is an enlarged partial sectional view taken along the lines 3—3 of FIG. 1, showing the arrangement of the input device.
Figure 4:
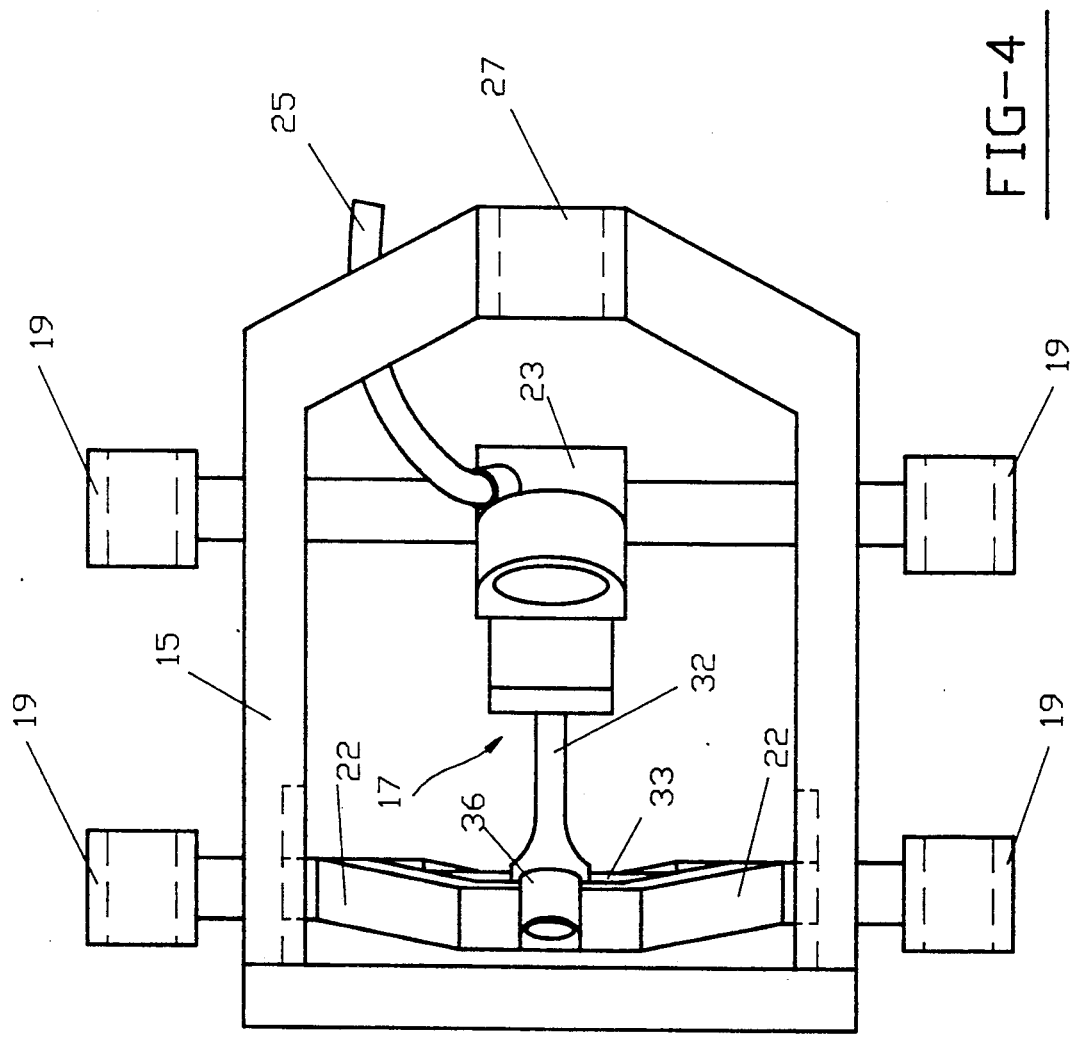
FIG. 4 is an enlarged top view, showing the structure of the frame mounting.

The devices 14 and 14a, each includes a respective frame (mounting) 15, a pair of friction wheel assemblies 16, a hydraulic piston cylinder (member) 17 and input shafts 18 (see FIGS. 1 and 4). The frame (mounting) 15 is rectangular in shape. Each opposite side of the frame 15 is outwardly carried by a guide ring 19 through which a respective support 20 is slidingly received. In this manner, it can be seen that the devices move by being slid on the rings of their frame 15 on the supports 20. Any suitable means, well known to those skilled in the art, such as the use of manual hand power may be utilized for this purpose. This is especially well shown in FIG. 3. A movable frame 21 is pivoted at the inner side in the leading end of the frame (mounting) 15. The plane at which the movable frame 21 is mounted is vertical to the plane on which the mounting 15 is located. The movable frame 21 comprises two opposite V-type arms 22 that are pivoted together for up and down pivotal movement. The end of each V-type arm 22 is in the form of a bent joint (see FIGS. 2 and 3). A cross arm 23 is vertically fixed within the frame (mounting) 15 and a cylinder chamber 24 is formed in the central portion of the cross arm 23, so as to accommodate (house) therein the hydraulic piston cylinder 17. An oil pipeline (conduit) 25 is mounted at side wall of cross arm 23 in fluid communication with the chamber 24. Two opposite ends of cross arm 23 are fixed at the opposite sides of the frame (mounting) 15 and the other two opposite ends include a respective self-aligning ball bearing 26. The rear ends of the opposite sides of frame (mounting) 15 intersect obliquely and a drum 27 is defined (mounted) at the intersection for accommodating a bearing 28.

The friction wheel assembly 16 includes a shaft (axis) that is pivoted at the leading end of the frame (mounting) 15 and includes a conical friction wheel 29. The one end of the shaft (axis) is pivoted at the bearing seat 36 of V-type arm 22. Intermediate of the other end of the shaft (axis), the shaft passes through the pivot bearing 26, and the other (tail) end of the shaft (axis) of the wheel 29 is integral with a driven bevel gear 30. By use of this pivot bearing 26 and seat 36, pivotal movement of the assembly 16 without accompanying jamming of the system is provided.

The hydraulic cylinder 17 is accommodated within the frame 15 and includes a compression spring 31, a piston rod 32 and a lateral bar 33 (see FIGS. 3 and 4). The spring 31 and piston rod 32 are disposed within the chamber 24 of said cross arm 23 and the end of the piston rod 32 extends outside the chamber 24 and expands to resemble a block. A lateral hole is provided for said lateral bar 33 to penetrate through the arm 23 in order to be able to be laterally displaced back and forth by the cylinder. Each end of the lateral bar 33 extends across the end of each V-type arm 22 and inside the leading end of the frame 15. To meet the requirement of the lateral bar 33 being displaced, the frame 15 has a pair of rectangular slots 34 formed therein (see FIGS. 1 and 4) starting at the inner edge on either side of the leading end along each of the respective major sides.

The drive power input shaft 18 is mounted at the rear end of the frame 15 and is forward penetrating through the drum 27 of mounting and pivoted to the bearing 28. The front end of the shaft 18 is secured to a driving bevel gear 35 for concomitantly driving the bevel gear 30 in rotation and further driving the friction wheel assembly 16 thereof.

Basic principle of the present invention is to drive the fly wheels 10 by means of the input device 14, in order to drive the output device 14a in rotation and high-speed output by means of both eccentric force and direct contact function of counter-rotation fly wheels 10. The input device 14 and the output device 14a are mounted toward the central line of the fly wheels 10. However, it is not required to specify an angle formed between the relative positions of the two devices. Besides, within the range of permissible transmission force of fly wheels 10 more than one unit of the input device 14 and the output device 14a may be provided, so as to meet the purpose of multi-shaft output. But it should be noted that under the premise not to affect said fly wheels genuine levelling degree or parallelness, the friction wheels 29 of the input device 14 and the output device 14a should be maintained in an expanded position towards the inner faces of fly wheels 10, so as to offer better positive pressure and compensation for friction loss, and to facilitate the operation of the friction wheels in order to drive fly wheels 10 in rotation effectively. Meanwhile, due to interior wear of the friction wheels 16, it is convenient to remove the input devices 14 and output devices 14a to facilitate maintenance and repair. The technique that enables friction wheels 29 to be held against or moved away from the fly wheels 10 is achieved through the movable frame 21 being expanded outwardly or contacted inwardly by the hydraulic member 17.

The object for friction wheels holding down the fly wheels is to promote driving accuracy of the friction wheels 29 and fly wheels 10. However, for practical use, rotational speed tends to be limited due to space restriction and over-increased positive pressure is likely to damage the mechanism, so that the means for increasing driving accuracy and transmission horsepower can be done through the design for increasing friction coefficient at contact surface between friction wheels 29 and fly wheels 10. Referring to the embodiments of this invention, the internal surface of the fly wheels 10 can be made so as to have a rough surface or convex sublattices, and the surface of friction wheels 29 of the input device 14 and output device 14a also can be made of plastic material.

It is foreseeable that inertia action and static friction may be difficult to overcome When we desire to start operating fly wheels 10, the input device 14 and output device 14a from a static state. To make it easier for the fly wheels 10 to be placed in rotation, as well as to reduce the load applied to the input device 14, before starting the variable speed mechanism of the present invention, it is preferred that the friction wheel 29 of said input device 14 contacts the rim of fly wheels 10 as close as possible, and the friction wheel 29 of the output device 14a should be positioned so as to contact the center of the fly wheels 10 as close as possible (as seen in FIG. 1).

When the input shaft 18 of the input device 14 is driven by external force in fixed-speed rotation friction wheel 16 is also placed in rotation to overcome inertia gravity from the fly wheels 10, enabling them to rotate slowly and in opposite directions relative to each other, whereby they can easily drive the friction wheel 16 of the output device 14a. At this moment, however friction wheel 29 is positioned near the center of the fly wheel to minimalize eccentric force, so that the friction wheel 16 is engaged in slow rotation only, i.e. the output shaft 18 is in slower rotation but its torsion is increased.

When the fly wheels 10 begin in fixed-speed rotation, the input device 14 should be gradually positioned closer to the center of fly wheel until it arrives at a predetermined position. At this moment, the input shaft 18, and the fly wheels 10 are engaged in fixed-speed rotation. When fly wheels 10 are in fixed-speed rotation, the friction wheel 29 also rotates in fixed speed. When the input device 14 is positioned near the center of fly wheel 10, input power would be reduced to economize energy and cause no loss of inertia upon fly wheels. The distance between the contact positioned to the center of the fly wheels 10 increases the eccentric force that is applied to the friction wheels 29 from the fly wheels 10 would increase significantly, whereby friction due to eccentric force increases to enable the friction wheel 16 to rotate faster, so that the output shaft 18 may receive a higher output speed. The more the output device 14a is moved outward, the higher the speed of the output shaft 18 is in rotation, whereby the present invention may achieve no-stage variable speed effect by means of the output device 14a movement. During the operation of variable speed, the diameter of fly wheel 29 has an extreme influence upon the output of the output device 14a. For practical application the diameter of fly wheels 29 may be enlarged or reduced subject to the user's requirement for output power.

When the fly wheels 10 and the friction wheels 29 contact each other and are in rotation, resistance therebetween would be decreased, so that the input device 14 and output device 14a shall suffer no severe stoppage during displacing. This is advantageous for the output device 14 displacing and reaching smooth effect of variable speed to avoid the defects such as vibration, noise and bumping that is found in conventional gearing mechanisms. The input device 14 and output device 14a can also be engaged in independent or synchronous displacement along the support 20, which is further advantageous for the present invention to develop the characteristics of smooth variable speed operation. For the displacement of the aforesaid devices, the source of power may match the mountings 15 or shafts 18 in order to select worm or hydraulic cylinder (member) which are well-known to those skilled in the art.

Certainly, to drive the fly wheels 10, the input device 14 and output device 14a, it is not necessary to apply friction only, and other means, such as gearing transmission, is also feasible. Since the rotational speed of gear transmission is easier to be controlled, it is only required to change friction wheel 29 into a bevel gear and provide a toothed face on the inner side (face) of the fly wheel 10. However, for use, it is permissible for the friction wheel 29, the input device 14 and output device 14a to be engaged in free displacing, so as to achieve no-stage variable speed effect. If the use of gear random displacement can not be permitted, except to control the hydraulic cylinder (member) 17 for intermittently breaking-away, engaging displacement to change position stage by stage, i.e. the output device 14a may receive greater output speed and horsepower than conventional gear transmission mechanism but variable speed operation is stage by stage.

As mentioned above, without resulting in interference, the output device 14 of said variable speed mechanism may be arranged in multiple assemblies. For application according to the present invention, the characteristics of multi-axial output, output horsepower and rotational speed increasing can be simultaneously applied in a working field such as automobile, factory or power plant in order to provide a power supply to various equipment and they can always achieve better power performance and economize input energy and power. As far as the application to a car is concerned, said variable speed mechanism may provide multi-shaft output function which is advantageous for being simultaneously applied to such mechanism as steering, gear and clutch system, etc., so as to enable the automobile industry to make a breakthrough development. What should be noted though is that the present invention has obtained higher output speed by means of fly wheel inertia energy and eccentric force. However, this higher rotational speed does not cause any problem to the present invention in respect of brake because the force input device 14 and output device 14a utilize friction transmission with the characteristics of smooth displacement; when the friction wheel 16 of the output device 14a is driven by the hydraulic member 17 to break away (separate) from fly wheels 10, i.e. friction wheel 29 breaks away from fly wheels 10, (see FIG. 2) the rotational speed of the output shaft 18 is reduced gradually, but the fly wheels remain in inertia rotation (idle drum), so that the output device 14a is not required to move away from the part between the fly wheels 10, whereby it is advantageous for selecting the position to contact the fly wheels 10 again and to obtain necessary rotational speed immediately therefrom. Besides, as far as fly wheels are concerned, the loss of dynamic energy and mechanical energy can be reduced. It is visible from such motion during the braking operation that the present invention also may operate like a clutch device. However, the present invention enables engaging-/disengaging and variable speed operation to be better than conventional clutch device by means of advantage of displacement, so that it can provide a significant contribution to industrial technology.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A variable speed transmission mechanism comprising: a pair of fly wheels positioned parallel to one another; a support for supporting the fly wheels, each of the flywheels having a respective center and a respective rim; an input device radially extending between and contacting each of the pair of fly wheels at a position between the centers and the rims thereof, whereby power input is provided to drive and rotate the fly wheels; an output device radially extending between and contacting each of the pair of fly wheels at a position between the centers and the rims thereof, whereby power output is received from the driven fly wheels being transferred thereto, the output device having the same structure as the input device, wherein when the input device drives the fly wheels at a fixed speed, the necessary input power is able to be reduced by changing the positioning of one of the input and output devices relative to the centers and the rims of the flywheels, so that by means of the transmission of unequal inertia eccentric force, the output device may reach smooth effect of variable speed; and wherein the input device includes a frame, and a pair of frictional wheel assemblies including respective input shafts being pivotal relative to the frame for selective contact of the fly wheels with the friction wheel assemblies of the input device, and a hydraulic member mounted within the frame, the hydraulic member being operatively connected to the input shafts for selectively pivoting the friction wheel assemblies into and out of contact with the fly wheels.

2. The variable speed transmission mechanism as claimed in claim 1, wherein the frame is substantially rectangular in shape having a rear end and two opposite sides, respective guide rings formed on the two opposite sides thereof a pair of guide supports, the guide supports being disposed on the two opposite sides of the frame, so that the guide support on each of the opposite sides is received through the respective guide rings, whereby the frame is supported by the guide supports; respective movable frames secured between the hydraulic member and the respective input shafts, whereby the hydraulic member is operatively connected to the respective input shafts for selectively pivoting of the shafts and the friction assemblies thereon, a cross arm including the hydraulic member fixed within the frame, the rear end of the opposite sides of the frame intersecting one another at an oblique angle, and a drum formed at the intersection of the rear ends of the frame for accommodating a bearing.

3. The variable speed transmission mechanism as claimed in claim 2, wherein the plane on which the movable frame is located being vertical to the plane on which the frame is located, the movable frame including two opposite V-type arms for providing up and down pivotal movement of the friction wheel assemblies.

4. The variable speed transmission mechanism as claimed in claim 3, wherein each friction wheel assembly includes a conical friction wheel mounted on each input shaft, each of the V-type arms including a first end having a bearing seat wherein the one end of the input shaft is pivotally received, and the other end of each axis being joined to a driven bevel gear.

5. The variable speed transmission mechanism as claimed in claim 3, wherein the hydraulic member further includes a lateral bar, the lateral bar having a pair of ends, the ends of said lateral bar being secured to respective second ends of each V-type arm for providing up and down movement of the friction wheel.

6. The variable speed transmission mechanism as claimed in claim 2, wherein the cross arms having a cylindrical chamber formed therein, to accommodate the hydraulic member, an oil conduit in communication with the chamber, the cross arm further having a pair of opposite ends and a pair of opposite sides, the opposite ends of the cross arm fixed at respective opposite sides of the frame, and the opposite sides of the cross arm including respective self-aligning bearings, the input shafts of the respective friction wheel assemblies for being set in the respective self-aligning bearings, whereby the friction wheel assemblies are pivotal relative to the frame.

7. The variable speed transmission mechanism as claimed in claim 6, wherein the hydraulic member having a compression spring and a piston rod accommodated within the chamber of the cross arm, a portion of the piston rod extending outside the chamber being enlarged to resemble a block.

8. The variable speed transmission mechanism as claimed in claim 2, further including a rotational drive power input shaft disposed extending through the drum of the frame being rotatably journaled by the bearing therein, selectively-mating bevel gears carried by the end of the drive power input shaft and the respective input shafts of the input device, so that rotation of the drive power input shaft rotates the input device therewith a driving bevel gear provided for driving the friction wheel assemblies.

9. An input device for a variable speed transmission mechanism comprised of:
 a rectangular frame having opposite sides, a cross arm carried by the frame, and a drum carried by the cross arm;
 a pair of parallel rotatable fly wheels;
 a pair of friction wheel assemblies disposed for being selectively disposed in communication with the fly wheels, whereby rotation of one of the friction wheel assemblies rotates the fly wheels and the other of the friction wheel assemblies therewith;
 a hydraulic member mounted within the frame, the hydraulic member having a compression spring and a piston rod, one end of the piston rod being provided with a lateral bar provided to drive said movable frame; and
 a power drive input shaft carried by the frame, being received through the drum, the input shaft having a one end, the one end of the shaft having a bevel gear thereon connected to the one end of the input shaft being proper to engage with the bevel gears of one of the friction wheel assemblies, such that when power is input by rotation of the power drive input shaft, the one of the friction wheel assemblies is rotated and the other of the wheel assemblies is rotated in response to the flywheels, thereby being able to output said power.

10. The input device as claimed in claim 9, wherein the plane on which the movable frame is located being vertical to the plane on which the frame is located, the movable frame including opposite V-type arms for providing pivotal movement of the friction wheel assemblies.

11. The input device as claimed in claim 9, wherein the cross arm has a chamber formed therein to accommodate the hydraulic member, an oil conduit in communication with the chamber, the cross arm further having a pair of opposite ends and a pair of opposite sides, the opposite ends of the cross arm fixed at respective opposite sides of the frame, and the opposite sides of the cross arm including respective self-aligning bearings in which the wheel assemblies are pivotally held.

12. A variable speed transmission mechanism, comprised of:
 a pair of parallel fly wheels;
 an input device positioned between the flywheels, the input device including a rotational frictional gear member that contacts both of the fly wheels, such that rotation of the frictional gear member rotates the fly wheels, the input device further including bevel gearing for receiving rotational input, such that the frictional gear members are driven through the bevel gearing;
 an output gearing positioned between the flywheels, the output device including a rotational frictional gear member that contacts both of the fly wheels, such that rotation of the fly wheels rotates the frictional gear member of the output device, the output device further including bevel gearing for providing rotational output in response to the rotational input through the bevel gearing;
 wherein the input device and the output device are structurally equivalent to one another;
 the input and the output devices further including respective movable V-type links for locating the respective input and output devices, and further including respective hydraulic pistons associated with the respective V-type links, whereby the respective input and output devices are located by use of the respective hydraulic pistons driving the respective movable V-type links.

* * * * *